United States Patent [19]
Shaberman et al.

[11] Patent Number: 6,055,593
[45] Date of Patent: *Apr. 25, 2000

[54] DUAL INFORMATION STRUCTURES FOR DIFFERENT ELECTRONIC DATA STORAGE CARD ENVIRONMENTS

[75] Inventors: Tony Shaberman, Roseville; Thomas Newman, Fremont, both of Calif.; Sean Casey, Singapore, Singapore

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/778,018

[22] Filed: Dec. 31, 1996

[51] Int. Cl.[7] ..................................................... G06F 13/00
[52] U.S. Cl. .............................. 710/74; 711/115; 711/170; 710/13
[58] Field of Search ..................................... 711/103, 115, 711/170; 395/281, 282, 283, 284, 309, 828, 833, 892, 894; 710/101, 102, 103, 104, 129, 8, 13, 72, 74

[56] References Cited

U.S. PATENT DOCUMENTS

| | | | |
|---|---|---|---|
| 5,497,464 | 3/1996 | Yeh | 395/281 |
| 5,572,683 | 11/1996 | Epolite et al. | 395/284 |
| 5,604,917 | 2/1997 | Saito et al. | 395/869 |
| 5,666,495 | 9/1997 | Yeh | 395/281 |
| 5,687,346 | 11/1997 | Shinohara | 711/130 |
| 5,761,528 | 6/1998 | Arai | 395/822 |
| 5,761,732 | 6/1998 | Shaberman et al. | 711/157 |

OTHER PUBLICATIONS

"Mar. 1996 Update Electrical Specification," 1996 PCMIA/JEIDA, pp. 2, 11, 62, 122, 11a, 11b, 193–194.

"Mar. 1996 Update Metaformat Specification," 1996 PCMCIA/JEIDA, pp. 54, 122a, 122b, 137, 189–192, 195–197.

"Mar. 1996 Update Card Services Specification," 1996 PCMCIA/JEIDA, pp. 75–76, 82, 78, 102, 135.

"Mar. 1996 Update Media Storage Formats Specification," 1996 PCMCIA/JEIDA, pp. 23–39, 41.

"Mar. 1996 Update Guidelines," 1996 PCMCIA/JEIDA/ pp. 50, 54, 61–62.

PC Card Standard, Chapter 2 Overview, 12 pages (PCMCIA/JEIDA May 1996).

"PC Card Standard Mar. 1996 Update," PCMCIA/JEIDA, pp: 2, 11, 11a–b, 62, 122, 137, 189, 54, 75, 78, 82, 102, 135, 23–41 odd only, 50, 54, 61, and 191, 193, 195, 197, (Mar. 1996).

"PC Card Standard Metaformat Specification," vol. 4, PCMCIA/JEIDA, pp. 1–111, (Nov. 1995).

"PCMCIA PC Card Standard, Release 2.01", Personal Computer Memory Card International Association, (Nov. 1992).

*Primary Examiner*—Do Hyun Yoo
*Assistant Examiner*—Gary J. Portka
*Attorney, Agent, or Firm*—Peter Lam

[57] ABSTRACT

The miniature card uses an Attribute Information Structure (AIS) for card recognition. The PC Card specification uses a Card Information Structure (CIS) for card recognition. The dual information structure definition provides a mechanism to allow a miniature card to be recognized and functional in both a PC Card environment and miniature card environment. The dual information structure mechanism incorporates the AIS structure into the CIS structure within the miniature card, thus allowing a card to be recognized and function in both environments.

11 Claims, 7 Drawing Sheets

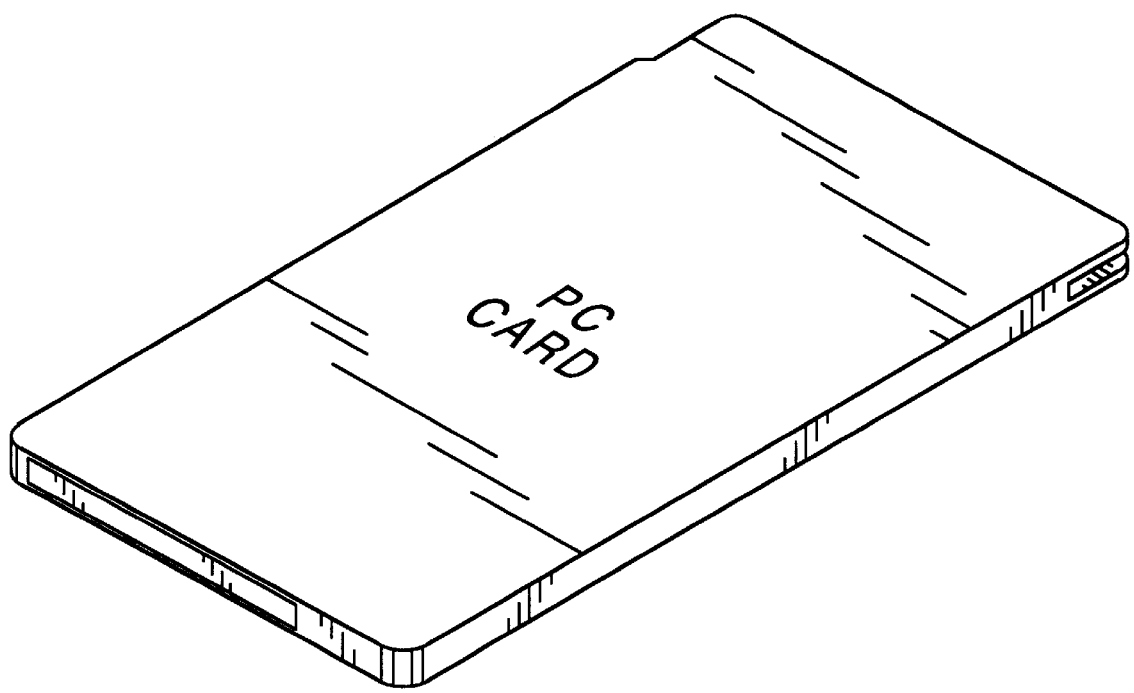
FIG_1 (PRIOR ART)

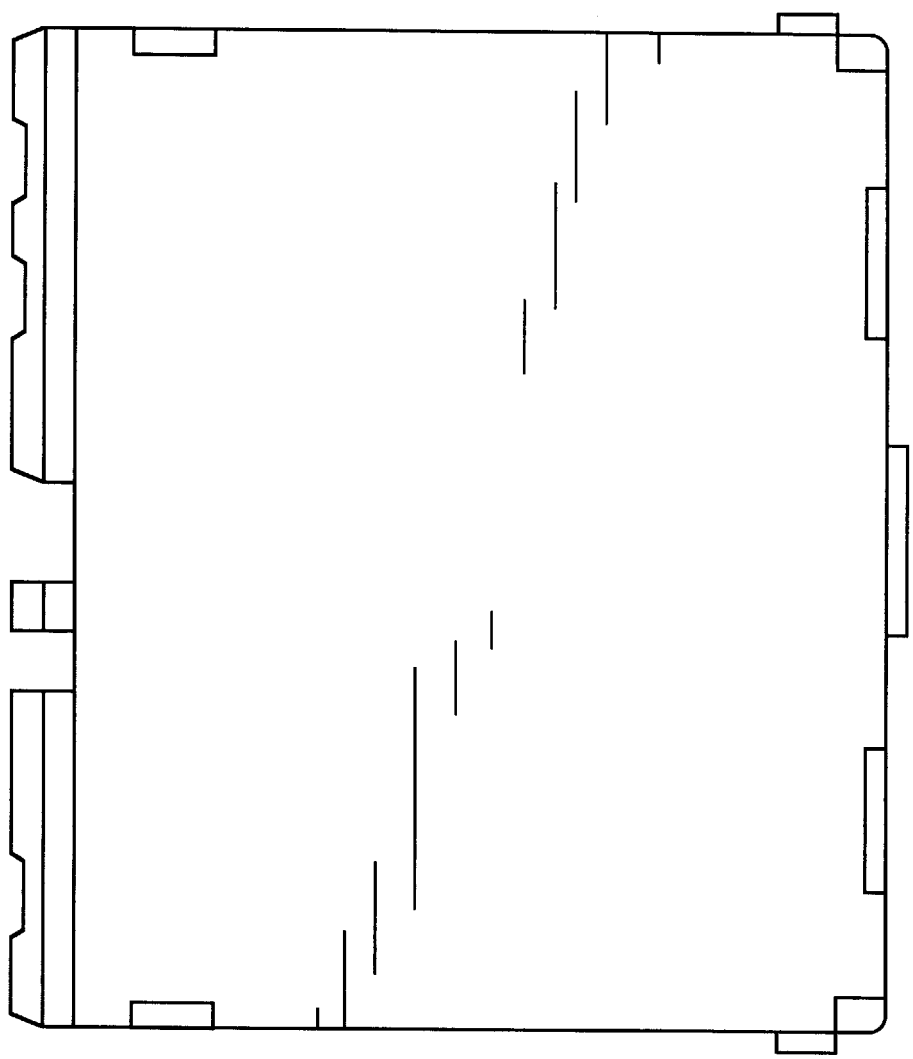
FIG_2A
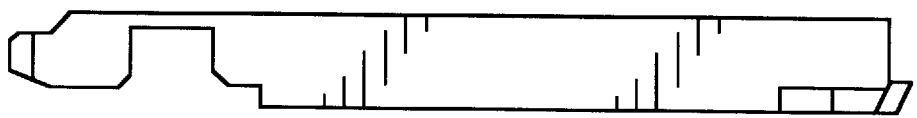
FIG_2B

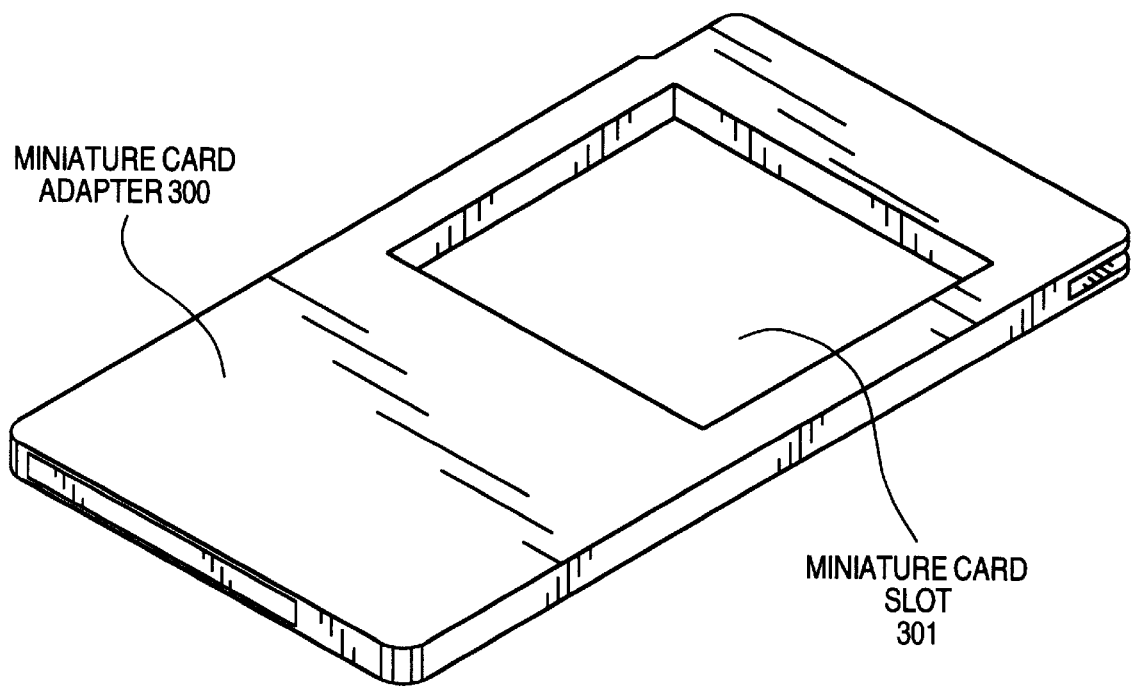
FIG_3

| BYTE | 7 | 6 | 5 | 4 | 3 | 2 | 1 | 0 |
|---|---|---|---|---|---|---|---|---|
| 0 | TPL_CODE | | TUPLE CODE: CISTPL_xxx | | | | | |
| 1 | TPL_LINK | | OFFSET TO NEXT TUPLE IN LIST. THIS CAN BE VIEWED AS THE NUMBER OF ADDITIONAL BYTES IN THE TUPLE EXCLUDING THIS BYTE. (n-1) | | | | | |
| 2 ... (n+2) | | | BYTES SPECIFIC TO THIS TUPLE | | | | | |
FIG_4A (PRIOR ART)
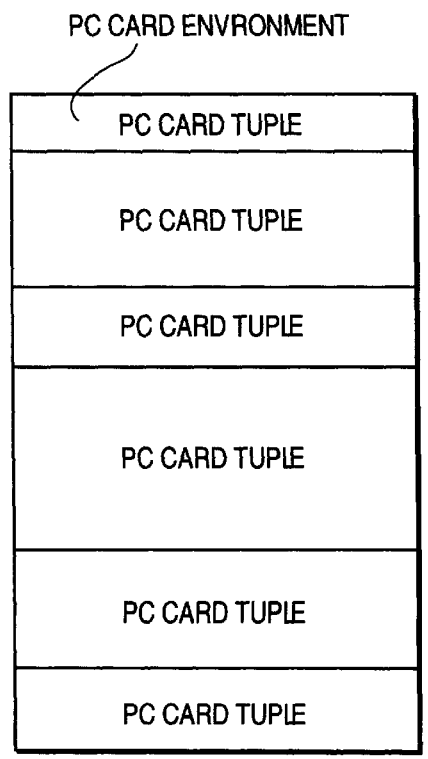
FIG_4B (PRIOR ART)

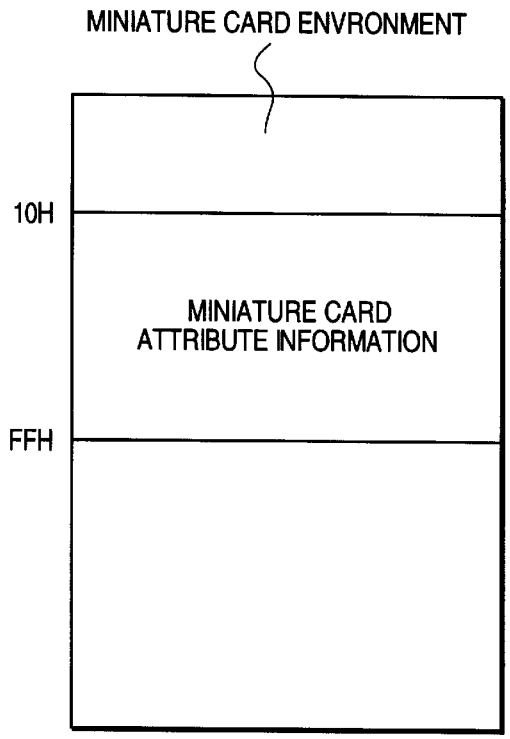
FIG_5
| AIS SECTION | DESCRIPTION | ADDRESS LOCATION |
|---|---|---|
| 600 IDENTIFICATION DATA | IDENTIFIES CARD TYPE | 10H-3FH |
| 601 COMPATABILITY DATA | DESCRIBES ATTRIBUTES OF CARD | 40H-4FH |
| 602 NOT USED | RESERVED FOR FUTURE USE | 50H-FFH |
FIG_6

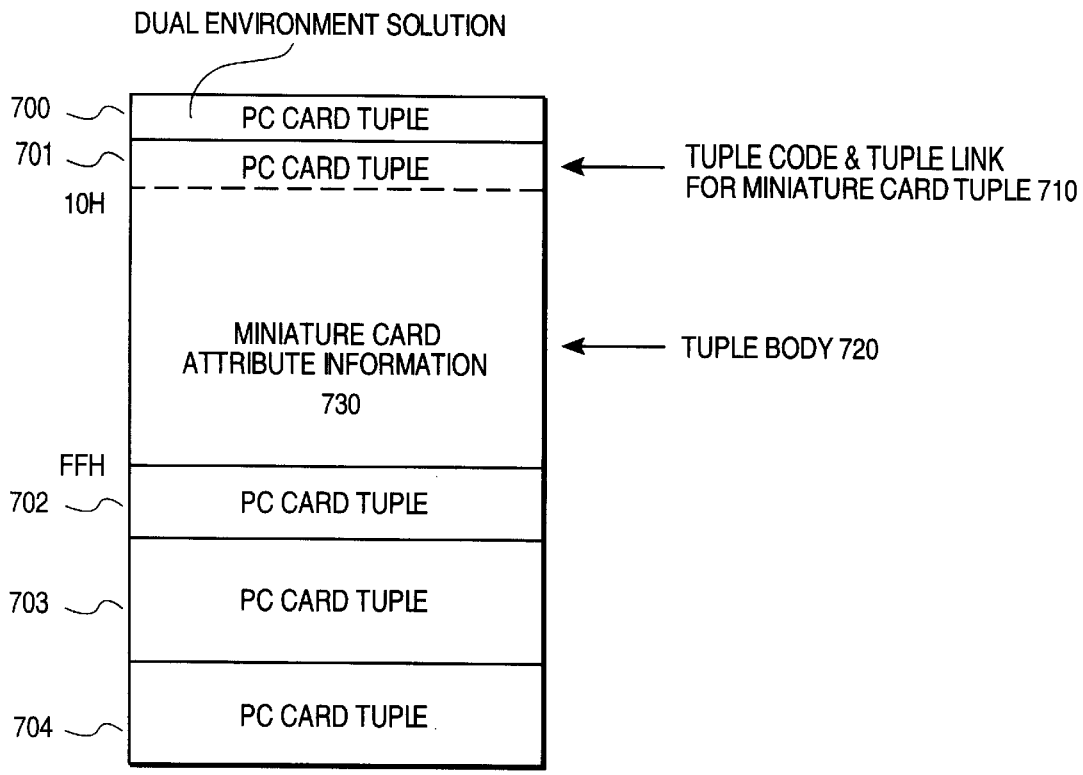
FIG_7
| TUPLE NAME | DESCRIPTION | TUPLE CODE | ADDRESS LOCATION |
|---|---|---|---|
| CISTPL_DEVICE | DEVICE INFORMATION | 01H | 0H-04H |
| CISTPL_NULL | NULL (IGNORE) | 00H | 05H-CDH |
| CISTPL_MINI | MINIATURE CARD AS (VENDOR UNIQUE) | 80H | 0EH-FFH |
| CONTINUE WITH OTHER REQUIRED TUPLES | | | |
FIG_8

| ADDRESS | VALUES | DESCRIPTION |
|---|---|---|
| 0EH | 80H | CISTPL_MIN |
| 0FH | F0H | TPL_LINK |
| 10H-FFH | | AIS INFORMATION (BYTES SPECIFIC TO THIS TUPLE) |

FIG_9

DUAL INFORMATION STRUCTURES FOR DIFFERENT ELECTRONIC DATA STORAGE CARD ENVIRONMENTS

FIELD OF THE INVENTION

The present invention relates to the information structure used in plug-in peripheral devices that are used for electronic data storage. More particularly, the invention describes a method of a dual information structure in a miniature card such that the miniature card is compatible with different electronic data storage card environments.

BACKGROUND OF THE INVENTION

To enable system and card manufacturers to build both computer and non-computer consumer products that can freely interchange plug-in peripheral cards, the PCMCIA Card standard was developed. The PCMCIA Card standard is also referred to as the PC Card standard. Electronic digital data is stored in the plug-in peripheral cards built according to the PC Card standard. For example, a computer stores digital data in a PC Card. To provide peripheral card compatibility, the PC Card standard defines the physical card attributes, the card interface attributes, and the card software attributes of the PC Card. One type of PC Card uses semiconductor memory, such as flash memory, located within the card for data storage. FIG. 1 is an illustration of a PC Card.

Although the standard PC Card has been useful in standardizing plug-in peripheral cards, it is not without its drawbacks. One problem arises from the manner in which the card information is stored. In the definition of card software attributes, the PC Card standard defines the manner in which the card information should be structured on the card. This information structure, called the Card Information Structure ("CIS"), is defined as one or more chains (or linked lists) of data blocks, called tuples. One problem with the linked list approach to storing information is that when the host system receiving the PC Card wants to retrieve information about the PC Card, the host system must go through each tuple in the linked list until the host system reaches the tuple containing the information that the host system is looking for. This results in undesired latency while the host system is looking for data. In addition, the above system results in added complexity for host system software because implementing the tuple reader is complex.

Another disadvantage of the PC Card standard is that for some products, the PC Card is too large. Products in which PC Cards are used are decreasing in size. As this occurs, the PC Card, although small, becomes too large for many applications. Thus, for some applications, the form factor of the PC Card is too large.

SUMMARY OF THE INVENTION

One desire of the present invention is to allow a smaller form factor card to be compatible with more than one card environment.

Another desire of the present invention is to help reduce the host system software complexity required to read peripheral cards.

Another desire of the present invention is to reduce latency involved in reading card attribute information from a peripheral card.

A peripheral card compatible with both a first card environment and a second card environment is described. The first card environment has a card information structure (CIS) with information stored in a linked list. The second card environment has an attribute information structure (AIS) with information stored in predefined fixed address locations.

Other desires, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which:

FIG. 1 is a drawing of a prior art PC Card.

FIG. 2(a) is a drawing of a top view of a miniature card.

FIG. 2(b) is a drawing of a side view of a miniature card.

FIG. 3 is a drawing of a miniature card adapter that allows a miniature card to conform to the physical dimensions of a PC Card.

FIG. 4(a) is a table showing a prior art format of a tuple according to the PC Card Standard.

FIG. 4(b) is a diagram of the prior art card information structure (CIS) used in the PC Card environment.

FIG. 5 is a diagram of the attribute information structure (AIS) used in the miniature card environment.

FIG. 6 is a table showing an exemplary AIS memory map of a miniature card having attribute memory space from address 10H–FFH.

FIG. 7 is a diagram showing the dual environment solution integrating the AIS into the CIS.

FIG. 8 is a table showing the CIS memory map of the miniature card dual information structure, using the vendor specific tuple for the AIS information.

FIG. 9 is a table showing the table entry for the vendor specific tuple of the miniature card of FIG. 3.

DETAILED DESCRIPTION

FIGS. 2A and 2B show respective top and side views of a miniature card that provides electronic digital data storage. For one embodiment, the miniature card uses flash memory within the card as the storage medium. The miniature card has a smaller form factor than the PC Card.

FIG. 3 shows a miniature card adapter 300 into which a miniature card can be inserted into the miniature card slot 301. Once the miniature card is inserted into the miniature card adapter 300, the adapter with the miniature card can be inserted into a PC Card slot on a product, such as a laptop computer.

The miniature card however, uses a different card information organization structure than the PC Card. The PC Card uses a Card Information Structure ("CIS"). The miniature card uses an Attribute Information Structure ("AIS") in order to help to reduce the latency problems associated with the linked lists of the PC Cards. Therefore, due to the differences in the information structures, products that follow the PC Card Standard are not otherwise able to recognize the miniature card when the miniature card is inserted into the adapter because the information on the miniature card is not in the form that the product requires, which is the form defined by the prior art PC Card CIS standard. To overcome this problem, the miniature card for one embodiment of the present invention uses a dual information structure mechanism that makes the miniature card compatible with both the PC Card environment and the miniature card environment.

The prior art PC Card Standard defines the manner in which information, such as the card's overall density, type, and other low level information, must be organized on the PC Card in order to remain compatible with the PC Card standard. The information structure defined by the standard, the Card Information Structure (CIS), is defined as one or more chains (or linked lists) of data blocks, called tuples, beginning at location 0 of the attribute memory space. The standard further defines a Basic Tuple Format and a Tuple Chain Structure. In the Basic Tuple Format, all tuples are defined as having the prior art format shown in FIGS. 4(*a*) and 4(*b*). Each tuple name is of the form CISTPL_xxx and all of the available tuples are defined in the PCMCIA PC Card Specification. The first byte (byte 0) of each tuple contains the tuple code, TPL_CODE 400, associated with that tuple (hex value). For example, CISTPL_NULL is the null tuple and has a corresponding tuple code of 00H. CISTPL_DEVICE is the device information tuple and has a corresponding tuple code of 01H. CISTPL_END is a special tuple indicating that there are no more tuples in the chain and has a corresponding tuple code of FFH. The next byte in the tuple, byte 1, contains a link to the next tuple in the chain 401. There are two ways to indicate that the tuple is the last tuple in the tuple chain. The first is by using the CISTPL_END tuple code (FFH) as described above. The second method is by using a tuple link of FFH. Following the tuple link, byte 2 through byte (n+2) contain the body of an n byte length tuple 402. If the link field (byte 1 of the tuple) is zero, then the tuple body is empty. In addition, a device-information tuple (CISTPL_DEVICE, 01H) must be the first tuple in the attribute memory space. Thus, in the manner described above, the PC Card CIS stores the card information structure in a linked list of tuples within the attribute memory space.

As shown in FIG. 5, the miniature card stores information in a fixed address location using an Attribute Information Structure (AIS), instead of the prior art CIS structure of the PC Card. Similar to the CIS, the AIS provides the host system with a means for identifying the miniature card. The AIS includes fundamental information about the miniature card, including memory type, speed, size, and configuration, which is used by the host to configure itself for optimized accesses to the miniature card. An exemplary AIS memory map is shown in FIG. 6. The AIS memory map consists of Identification Data 600, Compatibility Data 601, and a Reserved section 602. However, unlike the CIS, the AIS structure stores the card information in predefined fixed addresses within the card's memory. Therefore, when the host system receives a miniature card, the host system does not need to look through a linked list of tuples to find the desired information. Instead, the host system simply accesses the address location in which the desired information is defined to reside. The AIS information is stored in addresses 10H–FFH. An alternative address location can be predefined, however. The present invention is not limited to the address range discussed.

Because the miniature card stores information in the AIS format, and the PC Card stores information in the CIS format, miniature cards using the AIS format for information storage are not otherwise compatible in the PC Card environment. The dual information structure of one embodiment of the present invention overcomes this problem. Through the use of the dual information structure shown in FIG. 7, the miniature card meets both the AIS and the CIS specifications. In the dual environment solution, a linked list of tuples is used (700, 701, 702, 703, 704), thus conforming to the PC Card CIS format. PC Card tuple 701, following the PC Card tuple format, consists of a tuple code and tuple link 710 and a tuple body 720. The tuple body 720 is the miniature card attribute information 730 and is located between the predefined fixed address locations 10H and FFH (FIG. 6). Thus, in this manner, the miniature card can be used in both the PC Card environment and the miniature card environment.

FIG. 8 shows the memory map of the miniature card using the dual information structure according to one embodiment of the present invention. As discussed above, the CIS structure requires that the first tuple in the attribute memory space is the device information tuple, CISTPL_DEVICE 801. For one embodiment of the present invention, the attribute memory space begins at address 00H. Therefore, address location 00H contains the first tuple in the attribute memory space, which is the device tuple, CISTPL_DEVICE 801. For alternative embodiments, the attribute memory space may be defined to begin at an address other than 00H. For such situations, the device tuple would not be located at address 00H, but instead would be found in the address corresponding to location 0 in the attribute memory space. Following the device tuple, there are a series of null tuples, CISTPL_NULL 802. According to the CIS standard, each tuple must immediately follow the previous tuple. Therefore, in order to allow the device information tuple to be of varying lengths, after the device tuple there are a series of null tuples to fill the region between the end of the device tuple and the beginning of the CISTPL_MINI 803, discussed below. For the embodiment shown in FIG. 8, the device information tuple is located in address location 00H–04H and null tuples are located in address locations 05H–0DH. For alternative embodiments that use a longer device tuple, fewer null tuples are required.

Following the device tuple is a vendor specific tuple, CISTPL_MINI 803, defined in the miniature card as the region to store the AIS information of the miniature card. A vendor specific tuple is a special tuple defined by the PC Card standard to allow card vendors to implement proprietary functions while remaining within the general framework of the CIS structure. The standard defines tuple codes 80H–FEH as vendor specific tuple codes. These codes have no meaning to standard software. Therefore, in the absence of other information, standard software interprets vendor-specific codes as meaning "the information in this field is not specified." Thus, if a PC Card host system's tuple reader has not been set up to decode the particular vendor specific tuple implemented, then when the tuple reader reads a tuple code of 80H–FEH, the tuple reader will simply skip over the tuple and continue with the next tuple in the linked list.

Following the end of the vendor specific tuple, the linked list contains any other required tuples 804 for the host system. These tuples follow in the sequential, linked list manner described above by the PC Card standard.

FIG. 9 shows the table entry for the vendor specific tuple of FIG. 8. In this vendor specific tuple, CISTPL_MINI, the tuple structure described above is followed. The first byte (byte 0) of the tuple contains the tuple code 900. For this embodiment, because the tuple is a vendor specific tuple, the tuple code 80H is used. For alternative embodiments, any of the vendor specific tuple codes 80H–8FH can be used. The second byte (byte 1) of the tuple contains the tuple link 901. For this embodiment, because the AIS information location is defined as residing in address locations 10H–FFH, the tuple link is F0H, which indicates the length of the tuple so that the tuple reader knows how far to go to reach the next tuple in the linked list. Next is the body of the tuple 902. In this case, the body of the CISTPL_MINI tuple contains the AIS information of FIG. 6 and is located in address 10H–FFH.

Thus, in the manner described above, the miniature card's attribute information consists of the miniature card's Attribute Information Structure (AIS) as well as the PC Card's Card Information Structure (CIS). The CIS requirements are fulfilled by implementing all required tuples in the miniature card's attribute memory space. Through the use of the vendor specific tuple, the AIS information is also contained within the miniature card attribute memory space. In a PC Card environment, the vendor specific tuple will simply be ignored, and therefore, it will not effect the PC Card host system's ability to read the miniature card. In the miniature card environment, the tuple information is ignored by the miniature card host system, and the AIS information is accessed directly. Thus, these two structures co-exist for compatibility with both industry standards, allowing the miniature card to function in both the PC Card and Miniature card environments. Therefore, through the use of this dual information structure in a miniature card, the miniature card is compatible with and can be used in both the miniature card environment and the PC Card environment.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A method for providing a peripheral card which is compatible with both a PCMCIA PC Card environment and a miniature card environment, the peripheral card having an attribute memory space, and a predefined fixed address space, the method comprising:

storing a linked list of tuples in the attribute memory space;

storing a device tuple in a first address location of the attribute memory space as a first tuple in the linked list;

storing at least one null tuple following the device tuple;

storing a vendor specific tuple following the at least one null tuple such that a body of the vendor specific tuple begins at a first address of the predefined fixed address space, and ends at a second address of the predetermined address space; and storing the AIS (Attribute Information Structure) in the body of the vendor specific tuple.

2. The method of claim 1 where storing at least one null tuple comprises storing a plurality of null tuples when needed so that the vendor specific tuple follows a null tuple.

3. The method of claim 1 where storing the AIS information comprises storing the AIS information in predefined fixed address locations for access by a host system compatible with the miniature card environment.

4. An apparatus comprising:

a peripheral card compatible with both a PC Card environment and a miniature card environment, wherein the PC Card environment has a card information structure (CIS) with information stored in a linked list of tuples, wherein the tuples consist of a tuple code, a tuple link, and a tuple body, and the miniature card environment has an attribute information structure (AIS) with information stored in predefined fixed address locations, said peripheral card further comprising an attribute memory space;

a predefined fixed address space from a first address to a second address, for storage of the attribute information structure information, where the predefined fixed address space is a subset of the attribute memory space;

a plurality of tuples in a linked list located within the attribute memory space, the tuples containing a tuple code, a tuple link and a tuple body;

a first tuple in the linked list of tuples, the first tuple being a device tuple;

at least one null tuple following the device tuple in the linked list of tuples; and a vendor specific tuple following the at least one null tuple in the linked list of tuples, the vendor specific tuple having a body beginning at the first address of the fixed address space and ending at the second address of the fixed address space, the body for storing the AIS information.

5. The peripheral card of claim 4 where the vendor specific tuple comprises:

a first byte containing a tuple code in the range of 80H and FEH to identify the tuple as a vendor specific tuple;

a second byte containing a tuple link value such that the next tuple in the linked list of tuples begins after the second address of the fixed address space; and a tuple body containing the AIS information in fixed address locations within the tuple body, the AIS information stored in fixed address locations for access by a host system compatible with the miniature card environment.

6. The peripheral card of claim 5 where the AIS information comprises:

a first predefined address space for actually storing an identification data; and a second predefined address space for actually storing a compatibility data.

7. The peripheral card of claim 4 further comprising:

a tuple in the linked list following the vendor specific tuple, the tuple beginning at a next address location after the second address of the fixed address space.

8. The peripheral card of claim 4 where the at least one null tuple is a plurality of null tuples when such a plurality of null tuples is needed such that the vendor specific tuple follows a null tuple.

9. The peripheral card of claim 4 where the first address of the fixed address space is 10H and the second address of the fixed address space is FFH.

10. The peripheral card of claim 9 where the vendor specific tuple begins at 0EH, address location 0EH contains the tuple code, address location 0FH contains the tuple link and address locations 10H to FFH contain the AIS information.

11. The peripheral card of claim 7 where the tuple in the linked list following the vendor specific tuple is a tuple required by a PC Card host system.

* * * * *

UNITED STATES PATENT AND TRADEMARK OFFICE
CERTIFICATE OF CORRECTION

PATENT NO. : 6,055,593
DATED : April 25, 2000
INVENTOR(S) : Shaberman et al.

Page 1 of 1

It is certified that error appears in the above-identified patent and that said Letters Patent is hereby corrected as shown below:

Column 4,
Lines 18 and 19, delete "00Π " and insert -- 00H --.
Line 30, delete "00Π -04Π " and insert -- 00H-04H --.

Signed and Sealed this

Seventh Day of May, 2002

Attest:

JAMES E. ROGAN
Attesting Officer
Director of the United States Patent and Trademark Office